United States Patent [19]

Toshimitsu et al.

[11] 4,083,937

[45] Apr. 11, 1978

[54] PROCESS FOR PREPARING PURE PHOSPHORIC ACID

[75] Inventors: Itaru Toshimitsu; Sakumi Fujii; Masao Uchida; Yoshio Fujii, all of Shin-Nanyo, Japan

[73] Assignee: Toyo Soda Manufacturing Co., Ltd., Japan

[21] Appl. No.: 750,371

[22] Filed: Dec. 14, 1976

Related U.S. Application Data

[63] Continuation of Ser. No. 594,355, Jul. 9, 1975, abandoned.

[30] Foreign Application Priority Data

Jul. 9, 1974  Japan ................................. 49-77773

[51] Int. Cl.$^2$ ............................................. C01B 25/16
[52] U.S. Cl. ............................. 423/321 R; 423/321 S; 423/341
[58] Field of Search ................ 423/321 S, 321 R, 317, 423/341

[56] References Cited

U.S. PATENT DOCUMENTS

| | | | |
|---|---|---|---|
| 2,165,100 | 7/1939 | Hettrick | 423/321 |
| 2,987,376 | 6/1961 | Gloss | 423/321 |
| 3,151,941 | 10/1964 | Hollingsworth et al. | 423/321 |
| 3,193,351 | 7/1965 | Miller et al. | 423/321 R |
| 3,314,756 | 4/1967 | Myon | 423/317 |
| 3,366,448 | 1/1968 | Martin et al. | 423/321 S |
| 3,386,892 | 6/1968 | Schmidt et al. | 423/321 R |
| 3,397,123 | 8/1968 | Call | 423/321 |
| 3,544,269 | 12/1970 | Rushton | 423/321 |
| 3,615,195 | 10/1971 | Bierman et al. | 423/321 |
| 3,718,729 | 2/1973 | Amin et al. | 423/321 |
| 3,723,606 | 3/1973 | Klingelhoefer et al. | 423/321 S |
| 3,764,658 | 10/1973 | Darwin et al. | 423/321 |

OTHER PUBLICATIONS

Slack—Phosphoric Acid— pp. 610–612 — pp. 696–699 — pp. 711–714.

*Primary Examiner*—O. R. Vertiz
*Assistant Examiner*—Eugene T. Wheelock
*Attorney, Agent, or Firm*—Oblon, Fisher, Spivak, McClelland & Maier

[57] ABSTRACT

In a process for preparing a pure phosphoric acid whereby phosphate rock is treated with sulfuric acid or hydrochloric acid to prepare a crude phosphoric acid, and wherein said crude acid is solvent extracted with an organic solvent to prepare an extracted aqueous phosphoric acid solution which is then concentrated, the improvement which comprises adding a fluorine compound to said extracted aqueous phosphoric acid solution, and concentrating the mixture under a reduced pressure and thereafter, contacting the concentrated phosphoric acid solution with steam or hot air.

10 Claims, No Drawings

4,083,937

PROCESS FOR PREPARING PURE PHOSPHORIC ACID

This is a continuation of application Ser. No. 594,355, filed July 9, 1975, now abandoned.

BACKGROUND OF THE INVENTION

1. Field of the Invention

The present invention relates to a process for preparing a pure phosphoric acid from a crude aqueous phosphoric acid solution.

2. Description of the Prior Art

Crude phosphoric acid, prepared by decomposition of phosphate rock with sulfuric acid or hydrochloric acid, is purified using organic solvent-extraction methods or the like. In all these prior art processes, however, it is important to remove silica and flourine in order to prepare a phosphoric acid having a high degree of purity. The crude phosphoric acid usually contains relatively large amounts of these impurities depending upon the particular type of phosphate rock. Both a fluorine removal method and a silicofluoride recovery method for removing silicon and fluorine from the crude phosphoric acid have been proposed. However, these conventional methods have not proven to be satisfactory and the resulting purified phosphoric acid has not been of sufficient quality for use in foods.

A crude phosphoric acid typically contains 0.5 – 1% of Si and 2 – 3% of F. In the aforementioned silicofluoride recovering method, silica and fluorine are separated as precipitates of silicofluoride by addition of a precipitant such as sodium hydroxide, sodium carbonate, sodium chloride, potassium hydroxide, barium hydroxide or the like. This method is effective for treating crude phosphoric acid containing a large amount of silica and fluorine. However, an excess of the precipitant is required and the rate of removal of silicon and fluorine is only up to about 60%. It has been also disclosed to separate certain amounts of fluorine and silica by heating and condensing a crude phosphoric acid at high temperature (US Pat. No. 2,987,376). This method can be applied only to crude phosphoric acid containing relatively high amounts of silica and fluorine whereby a final concentration ratio of P/F, by weight, of about 100 – 200 is obtained. This is not satisfactory and, furthermore, the separation of silica is not disclosed.

The organic solvent-extraction method has also been proposed for removing impurities from a crude phosphoric acid. Certain impurities of silica and fluorine can be separated and removed by this method. However, the results are not satisfactory. The crude phosphoric acid usually contains an atomic ratio of F/Si of 4 – 6 as silicofluoride depending upon the kind of phosphate rock. When the crude phosphoric acid is treated by the organic solvent-extraction method, this combination of fluorine and silica is changed, depending upon the extraction process. The organic solvent-extraction method is usually conducted by counter-currently contacting a crude phosphoric acid with an organic solvent, such as an alcohol, e.g., butanol, in a series of extractors, e.g., mixer-settlers thereby repeating the extraction and separation, and then washing the extracted solution of the solvent and phosphoric acid and extracting phosphoric acid from it with water and the like. The dilute phosphoric acid obtained (from a counter-extractor) by the organic solvent-extraction method after contacting the extracted solution of the solvent and phosphoric acid with water (hereinafter referred to as the extracted aqueous phosphoric acid solution), contains fluorine and silica at an atomic ratio of F/Si of about 2 – 3. The fact of this decrease in the proportion of F has been found by the present inventors. The partition coefficients of silica and fluorine in the extraction of phosphoric acid (the ratio of the concentration in water to the concentration in the organic solvent) are usually 2 – 4 in the case of silica and 5 – 9 in the case of fluorine depending upon the nature of the organic solvent.

The inventors have found that silica precipitates as a scale of $SiO_2$ in the heat tubes of the evaporator thereby causing a decrease in heat efficiency and increasing the likelihood of an accident clogging the pipes when a crude phosphoric acid is treated by the organic solvent-extraction method and the resulting extracted aqueous phosphoric acid solution discharged from the counter-extractor is condensed without further treatment. The phosphoric acid prepared by concentrating the extracted aqueous phosphoric acid solution has a concentration of Si of 50 – 200 p.p.m. and a concentration of F of 100 – 500 p.p.m.. These impurity levels are not satisfactory for use as a pure phosphoric acid. Furthermore, when phosphoric acid salts are prepared using the phosphoric acid, precipitations of colloidal silica are formed in the neutralized mother liquor and resulting difficulties of operation ensue. Consequently, there is a need for a technique of purification of crude phosphoric acid wherein silica and fluorine impurities are adequately removed.

SUMMARY OF THE INVENTION

Accordingly, it is an object of the present invention to provide a process for preparing a pure phosphoric acid which contains substantially no Si or F (Si content of less than 20 p.p.m. and F content of less than 5 p.p.m.) and can be used for an additive in foods. It is another object of this invention to provide a process for preparing a pure phosphoric acid wherein the clogging of evaporator pipes is avoidable. It is still another object of this invention to provide a process for preparing a pure phosphoric acid using a purification technique having a high effective efficiency. Briefly, these and other objects of this invention as will hereinafter become clear by the ensuing discussion have been attained by providing a process for preparing a pure phosphoric acid whereby phosphate rock is treated with sulfuric acid or hydrochloric acid to prepare a crude phosphoric acid, and whereby said crude acid is solvent extracted with an organic solvent, to prepare an extracted aqueous phosphoric acid solution which is then concentrated the improvement which comprises adding a fluorine compound to said extracted aqueous phosphoric acid solution, and concentrating the mixture under a reduced pressure and thereafter, contacting the concentrated phosphoric acid solution with steam or hot air.

DETAILED DESCRIPTION OF THE PREFERRED EMBODIMENTS

In accordance with the process of this invention, a crude phosphoric acid is treated by organic solvent-extraction. Then, a fluorine compound is added to the resulting water-extracted aqueous phosphoric acid solution which is discharged from the counter-extracted aqeuous phosphoric acid solution which is discharged from the counter-extractor so as to yield an atomic ratio of F/Si of higher than 4, preferably 6 – 8. The mixture is concentrated under a reduced pressure, which can be less than 650 mmHg to vaporize most of the silica and a portion of the fluorine as $SiF_4$. Then the product is contacted with steam and/or hot air in a gas-liquid contacting apparatus so as to vaporize the remaining silica and fluorine producing a highly purified phosphoric acid.

The process of this invention will be illustrated in detail below. Suitable organic solvents used for the purification of the crude phosphoric acid, prepared by decomposing phosphate rock with sulfuric acid or hydrochloric acid by a multi-stage counter-current extracting method, include aliphatic alcohols, phosphoric acid esters, alkyl amines and the like as known in the art. The extracted aqueous phosphoric acid solution obtained by the organic solvent-extraction method usually contains silica and fluorine in an atomic ratio of F/Si of about 2 – 3. The precise ratio is dependent upon the kind of phosphate rock, the nature of the organic solvent and the number of extracting stages employed. Suitable fluorine compounds to be added to the solution include hydrofluoric acid and the like such as ammonium fluoride and sodium fluoride provided that the ammonium and sodium are permissible. The fluorine compound is added to the extracted aqueous phosphoric acid solution discharged from the counter current extractor in the final step of the extraction system. The concentration of the extracted aqueous phosphoric acid solution obtained by the organic solvent-extraction method is about 15 – 40% as $P_2O_5$. The fluorine compound is added to the extracted aqueous phosphoric acid solution and the mixture is concentrated under a reduced pressure to give about 54 – 69% as $P_2O_5$ whereby the Si in the mixture is removed by vaporization as $SiF_4$. When the amount of the added fluorine compound is increased, the removal of silica is completed. However, the amount of excess fluorine compound to be removed in the following step is increased. On the other hand, when no fluorine compound is added or when the amount of the fluorine compound employed is too small, difficulties with precipitation of silica in the heat tubes of the evaporator or clogging of the pipes ensues. Furthermore, the concentration of silica in the phosphoric acid product is too high to enable its use as a pure phosphoric acid. From these considerations, it is especially preferred to add the fluorine compound to the extracted aqueous phosphoric acid solution in a quantity which produces an atomic ratio of F/Si of higher than 4, especially 6 – 8. The evaporator used for the concentration is not critical but is preferably a multiple effect evaporator.

Most of the silica and a part of the fluorine are removed by the above-mentioned step. The remaining silica and fluorine are completely removed by the following step. The concentrated phosphoric acid solution discharged from the evaporator is contacted with steam and/or hot air in a gas-liquid contacting apparatus so as to vaporize the silica and fluorine in order to remove them from the concentrated phosphoric acid solution. Suitable such apparatus, includes plate towers such as a bubble cap tower and a packed tower. The concentrated phosphoric acid solution is fed from the top of the tower and steam and/or hot air is fed from the bottom of the tower. When steam is fed, the pressure of the tower can be either atmospheric or a reduced pressure. When hot air is fed, the temperature is preferably higher. The steam discharged from the gas-liquid contacting apparatus is economically used for preheating of the solution fed to the evaporator or as a heat source for the distilling tower used to recover the organic solvent. Sometimes, it is preferred to add a small portion of the fluorine compound so as to produce a desirable atomic ratio of F/Si in the concentrated phosphoric acid solution. However, it is usually preferred to add the fluorine compound all at once previously. When the concentrated phosphoric acid solution is contacted with steam and/or hot air, it is possible to remove substantially all of the silica and fluorine from the concentrated phosphoric acid solution, whereby the pure phosphoric acid in the bottom of the tower contains Si in less than 20 p.p.m., e.g., 5 – 15 p.p.m., and F in less than 5 p.p.m., e.g., 1 – 3 p.p.m. Chlorine can be also removed to give a Cl content of less than 1 p.p.m. The gas-liquid contact can be performed on the solution mid-way in the multiple effect evaporator.

In the process of the invention, it is further effective to remove the silica and fluorine in a crude phosphoric acid by first employing the silicofluoride recovering method and the like before applying the organic solvent-extraction method.

Having generally described the invention, a more complete understanding can be obtained by reference to certain specific examples, which are included for purposes of illustration only and are not intended to be limiting unless otherwise specified.

EXAMPLE 1

Crude wet process phosphoric acid ($P_2O_5$ of 35%) prepared by treating calcined phosphate rock (produced in Morocco) with sulfuric acid was extracted with n-butanol by a multi-stage counter-current extraction and was counter-extracted with water to obtain an extracted aqueous phosphoric acid solution having the following composition:

$P_2O_5$ b: 20.2 wt.%
Si: 0.0078 wt.%
F: 0.022 wt.%
Cl: 0.45 wt.%

Then, 0.0002 parts by volume of a 50% solution of hydrofluoric acid was added to 1 part by volume of the extracted aqueous phosphoric acid solution to give an atomic ratio of F/Si of 6 and the mixture was concentrated under a pressure of 650 mmHg (110 mmHg as absolute pressure) in a vacuum distilling apparatus to obtain 0.3 parts by volume of the concentrated phosphoric acid solution having the following composition:

$P_2O_5$: 54.2 wt.%
Si: 0.0054 wt.%
F: 0.0221 wt.%
Cl: 0.142 wt.%

The concentrated phosphoric acid solution was contacted with steam (0.2kg/cm² gauge pressure) at a ratio of 1 kg of $P_2O_5$ to 1.6 kg of steam, in a bubble cap tower, to obtain 0.3 parts by volume of pure phosphoric acid having the following composition:

$P_2O_5$: 54.2 wt.%
Si: 0.0006 wt.%
F: 0.0002 wt.%
cl: 0.0001 wt.%

As reference, the concentration and the steam treatment of the extracted aqueous phosphoric acid solution were repeated without adding any fluorine compound, to obtain 0.3 parts by volume of the phosphoric acid having the following composition:

$P_2O_5$: 54.2 wt.%
Si: 0.004 wt.%

F: 0.005 wt.%
Cl: 0.0001 wt.%

In the concentration step, a small amount of a precipitate of a silica component was found and the silica content of the phosphoric acid was remarkably high.

EXAMPLE 2

Crude wet process phosphoric acid ($P_2O_5$ of 35%) prepared by treating calcined phosphate rock (produced in Morocco) with sulfuric acid was extracted with tributylphosphate by a multi-stage counter-current extraction and was counter-extracted with water to obtain an extracted aqueous phosphoric acid solution having the following composition:

$P_2O_5$: 23.2 wt.%
Si: 0.002 wt.%
F: 0.004 wt.%
Cl: 0.03 wt.%

Then, 0.0003 part by volume of a 10% solution of ammonium fluoride was added to 1 part by volume of the extracted aqueous phosphoric acid solution to give an atomic ratio of F/Si of 4. The mixture was concentrated under a pressure of 650 mmHg (110 mmHg is absolute pressure) in a vacuum distilling apparatus. The resulting concentrated phosphoric acid solution was contacted with steam (0.3 kg/cm$^2$ gauge pressure) at a ratio of 1kg of $P_2O_5$ to 1.2 kg of steam, in a bubble cap tower, to obtain 0.3 parts by volume of pure phosphoric acid having the following composition:

$P_2O_5$: 54.2 wt.%
Si: 0.0008 wt.%
F: 0.0002 wt.%
Cl: 0.0001 wt.%

EXAMPLE 3

0.0004 part by volume of 50% hydrofluoric acid was added to 1 part by volume of the extracted aqueous phosphoric acid solution prepared in accordance with the process of Example 1, to give an atomic ratio of F/Si of 8 and the mixture was concentrated under a pressure of 650 mmHg (110 mmHg as absolute pressure) in a vacuum distilling apparatus to obtain 0.3 parts by volume of the concentrated phosphoric acid solution having the following composition:

$P_2O_5$: 54.2 wt.%
Si: 0.0004 wt.%
F: 0.025 wt.%
Cl: 0.142 wt.%

The concentrated phosphoric acid solution was contacted with a mixture of steam (0.2 kg/cm$^2$ guage pressure) with steam and hot air (90° C) at a ratio of 1 kg of $P_2O_5$ to 1.0 kg of steam and 0.3 kg of hot air, to obtain 0.3 parts by volume of pure phosphoric acid having the following composition:

$P_2O_5$: 54.2 wt.%
Si: 0.0007 wt.%
F: 0.0003 wt.%
Cl: 0.0001 wt.%

EXAMPLE 4

A concentrated phosphoric acid solution was prepared in accordance with the process of Example 1. The composition is as follows:

$P_2O_5$: 54.2 wt.%
Si: 0.0054 wt.%
F: 0.0221 wt.%
Cl: 0.142 wt.%

The concentrated phosphoric acid solution was contacted with hot air (90° C) at a ratio of 1 kg of $P_2O_5$ to 2.5 kg of hot air, in a bubble cap tower, to obtain 0.3 part by volume of pure phosphoric acid having the following composition:

$P_2O_5$: 54.2 wt.%
Si: 0.0009 wt.%
F: 0.0004 wt.%
Cl: 0.0001 wt.%

EXAMPLE 5

Crude wet process phosphoric acid ($P_2O_5$ of 10%) prepared by treating calcined phosphate rock (produced in Florida) with hydrochloric acid was extracted with n-butanol by a multi-state counter-current extraction and was counter-extracted with water to obtain an extracted aqueous phosphoric acid solution having the following composition:

$P_2O_5$: 10.4 wt.%
Si: 0.010 wt.%
F: 0.025 wt.%
Cl: 8.9 wt.%

Then, 0.0003 part by volume of 50% hydrofluoric acid was added to 1 part by volume of the extracted aqueous phosphoric acid solution to give an atomic ratio of F/Si of 6 and the mixture was concentrated under a pressure of 650 mmHg (110 mmHg as absolute pressure) in a vacuum distilling apparatus to obtain 0.13 part by volume of the concentrated phosphoric acid solution having the following composition:

$P_2O_5$: 57.0 wt.%
Si: 0.0021 wt.%
F: 0.0095 wt.%
Cl: 0.58 wt.%

The concentrated phosphoric acid solution was contacted with steam (0.2 kg/cm$^2$ gauge pressure) at a ratio of 1 kg of $P_2O_5$ to 1 kg of steam in a sieve tray tower, to obtain 0.13 part by volume of pure phosphoric acid having the following composition:

$P_2O_5$: 57.0 wt.%
Si: 0.0009 wt.%
F: 0.0003 wt.%
Cl: 0.0001 wt.%

EXAMPLE 6

0.0009 part by volume of 4% solution of sodium fluoride was added to 1 part by volume of the extracted aqueous phosphoric acid solution prepared in accordance with the process of Example 2, to give an atomic ratio of F/S of 4, and the mixture was concentrated under the pressure of 650 mmHg (110 mmHg as absolute pressure) in a vacuum distilling apparatus. The concentrated phosphoric acid solution was contacted with steam (0.3 kg/cm$^2$ gauge pressure) at a ratio of 1 kg of $P_2O_5$ to 1.2 kg of steam, in a bubble cap tower, to obtain 0.3 part by volume of pure phosphoric acid having the following composition:

$P_2O_5$: 54.2 wt.%
Si: 0.0008 wt.%
F: 0.0002 wt.%
Cl: 0.0001 wt.%

Having now fully described the invention, it will be apparent to one of ordinary skill in the art that many changes and modifications can be made thereto without departing from the spirit or scope of the invention as set forth herein.

What is claimed as new and desired to be secured by Letters Patent in the United States is:

1. In a process for preparing and purifying phosphoric acid whereby phosphate rock containing silica impurities is treated with sulfuric acid or hydrochloric acid to prepare a crude phosphoric acid containing silica, fluorine and chlorine impurities and wherein said crude acid is solvent extracted with an organic solvent to prepare an extracted aqueous phosphoric acid solution reduced in fluorine and silica impurites but whose residual fluorine/silicon content ratio is also decreased, which is then concentrated, the improvement which comprises:

mixing a fluorine compound with said extracted aqueous phosphoric acid solution of a form such that it reacts with said $SiO_2$ in the extracted phosphoric acid solution and in an amount such that the atomic ratio of F/Si is greater than 4, thereby converting said silica to $SiF_4$, and concentrating the mixture by evaporating water under a reduced pressure whereby significant quantities of Si, F and Cl impurities are vaporized;

contacting the concentrated phosphoric acid solution with steam or hot air to vaporize the remaining Si, F and Cl impurities such that the concentration levels of Si, F and Cl remaining in the acid are less than 20 ppm, 5 ppm and 1 ppm, respectively, thereby obtaining a purified phosphoric acid solution.

2. The process of claim 1, wherein said extracted aqueous phosphoric acid solution contains 15–40% by weight of $P_2O_5$, and concentration is conducted under a pressure of less than-650 mmHg.

3. The process of claim 1, wherein said concentrated phosphoric acid is contacted with steam or hot air in a plate tower or packed tower.

4. The process of claim 3, wherein said plate is a bubble cap tower, or a sieve tray tower.

5. The process of claim 1, wherein the step of contacting steam or hot air with the phosphoric acid solution is performed in a multiple effect evaporator.

6. The process of claim 1, wherein said fluorine compound is added to said extracted aqueous phosphoric acid solution so as to give an atomic ratio of F/Si of 6-8 in said solution.

7. The process of claim 1, wherein the fluorine compound is hydrofluoric acid or a salt thereof.

8. The process of claim 1, wherein a small amount of the fluorine compound is added to said concentrated phosphoric acid solution to give an atomic ratio of F/Si of higher than 4 in said solution.

9. The process of claim 2, wherein the concentration of $P_2O_5$ after the concentration step is 54–69%.

10. In a process for preparing and purifying phosphoric acid whereby phosphate rock containing silica impurities is treated with sulfuric acid or hydrochloric acid to prepare a crude phosphoric acid containing silica, fluorine and chlorine impurities, and wherein said crude acid is solvent extracted with an organic solvent to prepared an extracted aqueous phosphoric acid solution reduced in fluorine and silica impurities but whose residual fluorine/silicon content ratio is also decreased, which is then concentrated, the improvement which comprises:

mixing a fluorine compound with said extracted aqueous phosphoric acid solution of a form such that it reacts with said $SiO_2$ in the extracted phosphoric acid solution and in an amount such that the atomic ratio of F/Si is 6-8 in said solution, thereby converting said silica to $SiF_4$, and concentrating the mixture by evaporating water under a reduced pressure of $-650$ mmHg whereby significant quantities of Si, F and Cl impurities are vaporized;

contacting the concentrated phosphoric acid solution with at least one of steam or hot air in a bubble cap tower to vaporize the remaining Si, F and Cl impurities such that the concentration levels of Si, F and Cl remaining in the acid are less than 20 ppm, 5 ppm, and 1 ppm, respectively thereby obtaining a purified phosphoric acid solution.

\* \* \* \* \*